Aug. 13, 1957 G. L. FOGAL 2,802,690
PARACHUTE RELEASE MECHANISM
Filed July 2, 1951 2 Sheets-Sheet 1
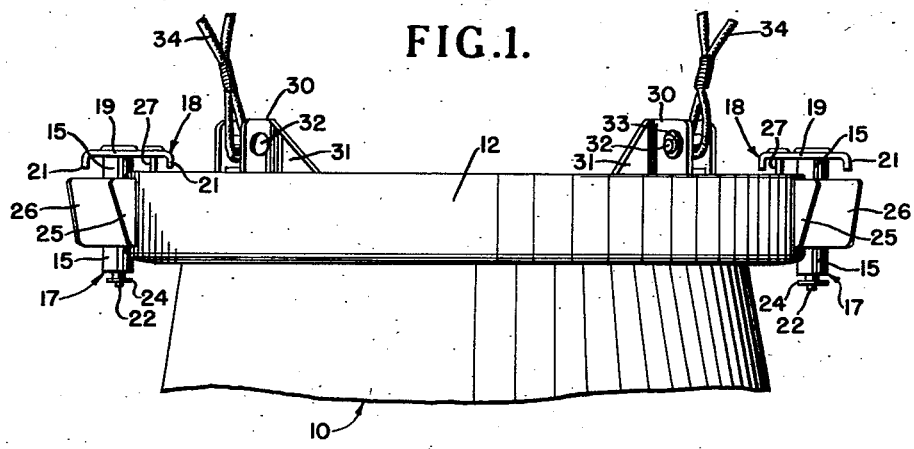
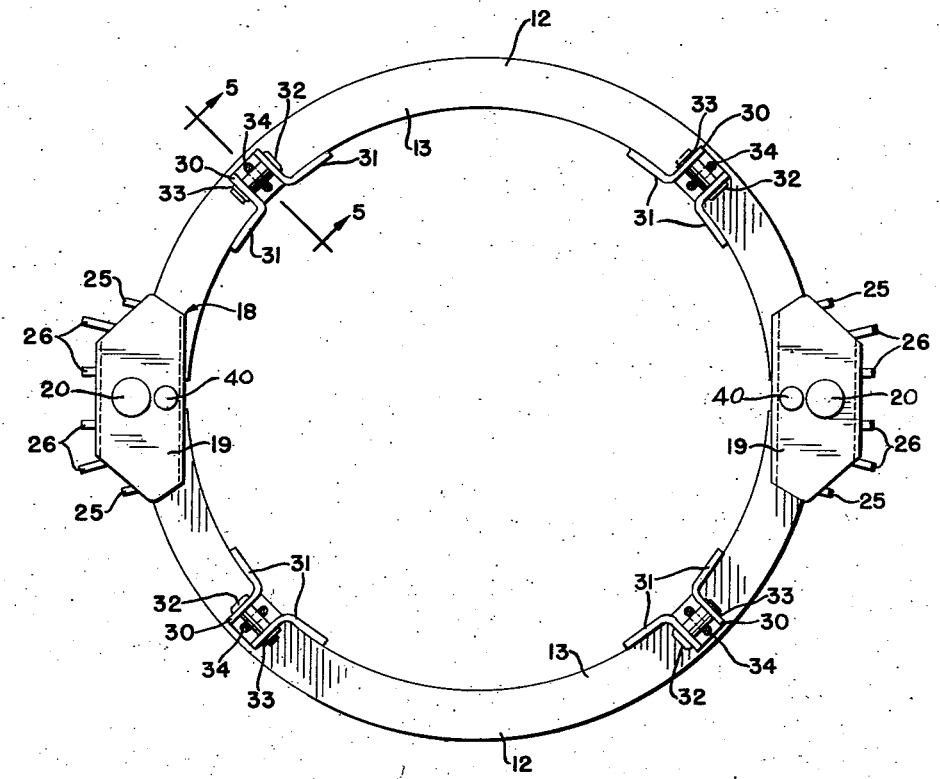
INVENTOR.
G. L. FOGAL Aug. 13, 1957 G. L. FOGAL 2,802,690
PARACHUTE RELEASE MECHANISM
Filed July 2, 1951 2 Sheets-Sheet 2

INVENTOR.
G. L. FOGAL
BY
G. L. O'Brien
R. M. Hicks
ATTYS.

United States Patent Office 2,802,690
Patented Aug. 13, 1957

2,802,690

PARACHUTE RELEASE MECHANISM

Gordon L. Fogal, Silver Spring, Md.

Application July 2, 1951, Serial No. 234,895

3 Claims. (Cl. 294—83)

(Granted under Title 35, U. S. Code (1952), sec. 266)

The present invention relates to parachute release apparatus, and more particularly the invention relates to improvements in the apparatus disclosed in Patent No. 2,502,455 issued to Alvin C. Hall et al., for Parachute Release Mechanism.

In the prior patent to Hall et al. the release mechanism comprises four segmental strips forming a ring and joined at two diametrically opposed points by clamping screws and at two diametrically opposed points ninety degrees from the first named points by hingelike joints secured together by the pin extensions of a pair of paddle members. The pin extensions of the paddle members, in order to slide out of the joints when the paddle members strike the surface of a body of water, must have a predetermined amount of tension applied thereto by the clamping screws. In the field it has been found that, because of inadequate testing equipment and overzealous or inadequate tightening of the clamping screws, the pin extensions have either failed to pull out of the hingelike joints as the paddles strike the water and thus the parachute was not released from the mine or the segmental ring was clamped too loosely and the ring separated from the mine as the parachute opened.

The present invention obviates the aforementioned causes of failure of the prior patent by eliminating the clamping screws and forming the ring of two segments having deep inwardly turned flanges at the top and bottom edges thereof, the ring segments being joined together by the pin extensions of the paddle members and fitting loosely the tail flange of a mine to which the device is attached. It is, of course, understood that the inner diameters of the flanges of the segments are of less diameter than the outer diameter of the tail flange of the mine. Thus, while the segmental ring fits the tail flange loosely and the tension on the pin extensions is negligible, there is no tendency of the ring to slip off the tail flange of the mine prior to withdrawing the pin extensions.

An object of the present invention is to provide a new and improved parachute release mechanism for use with an aircraft launched marine mine which is positive in operation and which is independent of clamping screws for the attachment thereof to the mine.

Another object is to provide a new and improved parachute release mechanism which is equally adaptable for operation by paddles or inertia members on impact of the paddles or mine with the surface of a body of water.

A further object is to provide a new and improved parachute release mechanism which is loosely, and at the same time, securely attached to a mine whereby tension on the releasing mechanism is maintained at a minimum and therefore the release of the parachute is facilitated.

A still further object is to provide a new and improved parachute release mechanism having a pair of flanged segmental ring members releasably joined together in a simple and efficient manner.

Other objects and many of the attendant advantages of this invention will be readily appreciated as the same becomes better understood by reference to the following detailed description when considered in connection with the accompanying drawings wherein:

Fig. 1 is a side elevation of the device of the present invention and showing a portion of a mine to which the invention is attached;

Fig. 2 is a top plan of the device per se;

Figure 3:
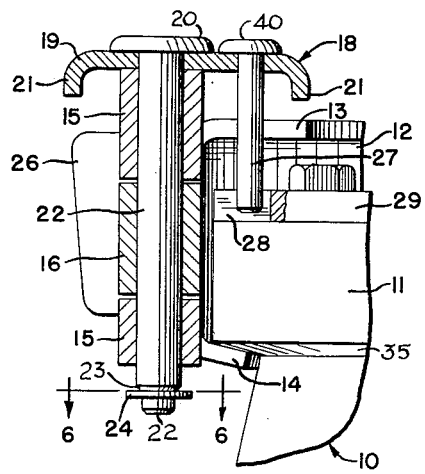
Fig. 3 is a sectional view taken along the line 3—3 of Fig. 4.
Figure 4:
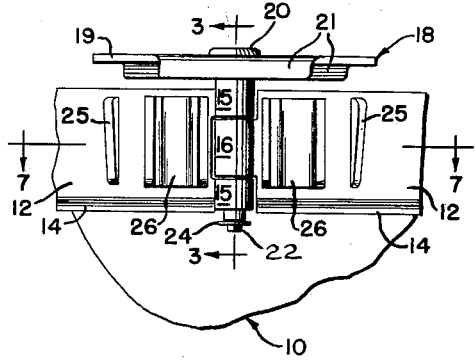
Fig. 4 is an enlarged elevation of one of the paddles and associated ring portions.
Figure 5:
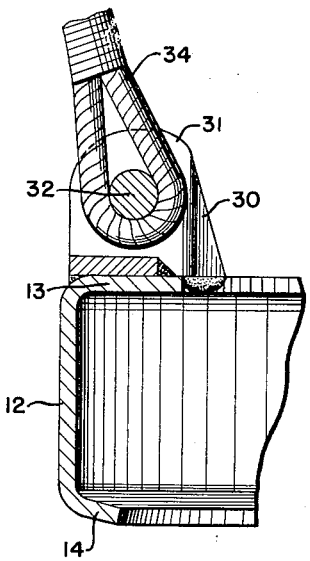
Fig. 5 is a sectional view taken along line 5—5 of Fig. 2.
Figure 7:
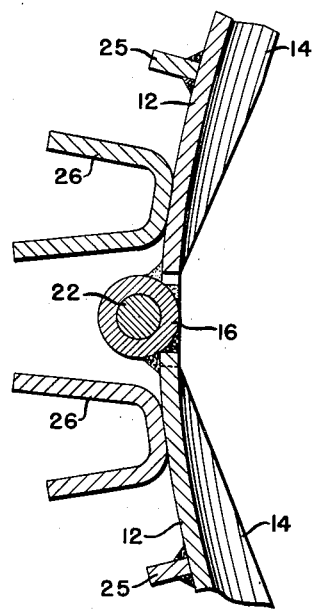
Fig. 7 is a sectional view taken along line 7—7 of Fig. 4.

Referring more particularly to the drawings wherein like numerals indicate like parts throughout the several views, 10 indicates generally a mine having a tail flange or ring 11 to which the device of the present invention is attached.

The parachute release mechanism of the present invention comprises a pair of rigid semicircular ring segments or members 12 forming when joined together a segmented or articulated circular ring. Each of the segments 12 has an upper flange 13 and a tapered lower flange 14. The ring members 12 have secured at the ends thereof by welding or other means tubular members 15 and 16. Each of the rings 12 have a pair of spaced members 15 at one end thereof and a single member 16 at the other end thereof. The members 15 and 16 are adapted to be fitted together to form a pair of diametrically opposed hinge-like members indicated generally at 17.

Figure 6:
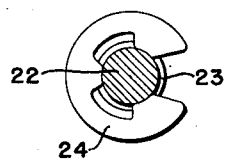
Fig. 6 is a sectional view taken along line 6—6 of Fig. 3.

The paddle members are indicated generally at 18 and comprise plates 19 having flanges 21 at the inner and outer edges thereof for stiffening the plates. Each of the paddle members 18 has a mounting pin 22 secured to plate 19 by welding 20 or other means. One of the pins 22 extends through members 15 and 16 of each of the hingelike members 17 thus securing together the two semicircular ring members 12. The portions of pins 22 extending below members 17 are provided with circumferential grooves 23 which are fitted with locking rings 24 (Figs. 3 and 6) of a well-known variety. Rings 24 prevent displacement of pins 22 from members 17 until the members 19 come into contact with the surface of a body of water after mine 10 is launched from an aircraft as will be hereinafter more fully described.

Each of the ring members 12 is provided adjacent the ends thereof with single guards 25 and double guards 26 which are secured thereto by welding or other means, the guards being positioned thereon for the purpose of protecting the plates 19 from accidental displacement or damage while, at the same time, providing a minimum of interference to the passage of water against the plates 19.

In order to fix the foregoing assembly rotationally on the tail flange 11 of mine 10, locating pins 27 are secured by welding 40 or other means to plates 19 and extend downwardly into bores or slots 28 in the tail plate 29 of the mine, thus the foregoing mechanism is prevented from rotating with respect to the mine.

Attached by welding or other means to the flanges 13 of segmented rings 12 is a plurality of equidistantly spaced clevises 30 provided with tapered flanges 31 and having transverse bores to receive headed pins 32, the pins 32 being provided with grooves at the ends opposite the heads to receive locking rings 33 thus retaining pins 32 in clevises 30. Shroud lines 34 of a parachute (not shown) are looped over the pins 32 thus securing the ring members to the parachute.

In operation, the rigid ring members 12 are secured together around the tail flange 11 of mine 10, by the pair of pins 22 passing through hingelike members 17. The ring members 12 fit the tail flange 11 loosely and are prevented from being displaced therefrom by the flanges 13 and 14 which have a lesser inside diameter than the outer diameter of the flange 11. It will be seen that with the present arrangement, clamping screws are not employed and, therefore, no adjustment of tension on the rings 12 is necessary, thus the assembly of the rings on the mine is greatly simplified. The device may be mounted on a mine in the field without special or complicated instructions.

After the mine is launched from an aircraft and the parachute opens, the mine is supported on the rings by the lower flanges 14 during the line of free flight of the mine, the lower flanges being tapered to fit a tapered surface 35 on the flange 11 and to assist in camming off the semicircular rings from the flange 11 as the pins 22 are pulled from hinge members 17 when the plates 19 strike the surface of a body of water, the locking rings 24 being displaced from grooves 23 concurrently therewith.

As the rings 12 are cammed from the flange 11 the parachute is separated from the mine.

A particular advantage of the structural arrangement of the present invention is that the parachute will be released from the mine on impact with the surface of a body of water when only one of the pins 22 is withdrawn from the hingelike joints of the ring members.

It is understood that, if desired, the upper flanges 13 may be dispensed with in a slight modification of the invention (not shown) without departing from the spirit or the useful function thereof. In such case the clevis members may be attached to the outer vertical faces of the ring members.

Obviously many modifications and variations of the present invention are possible in the light of the above teachings. It is therefore to be understood that within the scope of the appended claims the invention may be practiced otherwise than as specifically described.

The invention herein described may be manufactured and used by or for the Government of the United States of America for governmental purposes without the payment of any royalties thereon or therefor.

What is claimed as new and desired to be secured by Letters Patent of the United States is:

1. A parachute release mechanism for an aerial launched mine comprising, in combination, a pair of rigid semicircular ring members each having an inwardly projecting upper flange and an inwardly and downwardly tapered lower flange, said flanges being arcuately formed throughout their length, said mine having a tail flange thereon of predetermined outside diameter, said upper and lower flanges each having an inner diameter less than the predetermined outside diameter of said tail flange, a plurality of hingelike members secured to said ring members at the end portions thereof, the hingelike members at the ends of one of said ring members interfitting the hingelike members of the other of the ring members, a pin mounted in each of said hingelike members for releasably securing said ring members together loosely on said tail flange with the tail flange disposed intermediate said upper and lower flanges, flanged paddle members respectively secured at the upper end of each of said pins, the surfaces of said paddle members being at right angles to the pins and to the line of free flight of said mine, each of said pins having a circumferential groove adjacent the lower end thereof, a pair of snap rings, one each of said rings being respectively mounted in each one of said grooves for releasably securing the pins in said hingelike members, said snap rings being forcibly displaced from said pins as the paddles strike the surface of a body of water and the pins are disengaged from the hingelike members and the ring members are disconnected from the mine by camming action of the mine tail flange against said tapered flange.

2. A parachute release mechanism for an aircraft launched mine having a tail flange of predetermined diameter and comprising, in combination, an articulated ring member comprising a pair of rigid separable semicircular sections and having the shroud lines of the parachute attached thereto, an upper inturned right-angular flange and a lower downwardly inturned flange integrally formed on each of said sections, said flanges being arcuately formed throughout their length and having an inner diameter less than the predetermined diameter of said tail flange, said tail flange being disposed intermediate said upper and lower flanges and having an upper right angular surface to match said upper inturned right-angular flange and a lower surface conformingly matching said lower downwardly-inturned flange thereby to enable the ring member to cam off the tail flange of the mine when the sections are disengaged, a plurality of alternate tubular members secured to adjacent ends of said sections and forming a plurality of hingelike members when joined, a pin mounted in each of said hingelike members for releasably joining said tubular members together and securing the ring member to the mine, a pair of paddle members each mounted on the upper end of a respective one of said pins, said paddle members being mounted at a right angle to the line of flight of said mine and projecting outwardly thereof, a pair of locking rings, each of said pins having a circumferential groove adjacent the lower end thereof for receiving a respective one of said locking rings, said locking rings preventing displacement of said pins until the paddles strike the surface of a body of water with sufficient force to withdraw said pins from the tubular members and causing separation of the sections of the articulated ring member sufficiently to disengage the parachute from the mine by pressure of lower surface of said tail flange against said lower downwardly-inturned flange.

3. A parachute release mechanism for an aerial launched mine according to claim 1 including means comprising at least one pin and a complementary recess therefor in said tail flange for preventing rotative movement of the ring with respect to the mine.

References Cited in the file of this patent

UNITED STATES PATENTS

| | | |
|---|---|---|
| 2,502,455 | Hall et al. | Apr. 4, 1950 |
| 2,565,470 | Brown | Aug. 28, 1951 |
| 2,597,551 | Van Nort | May 20, 1952 |